US008959556B2

(12) United States Patent
Stokes et al.

(10) Patent No.: US 8,959,556 B2
(45) Date of Patent: Feb. 17, 2015

(54) METHODS AND APPARATUS FOR DETERMINING THE OPERATING STATE OF AUDIO-VIDEO DEVICES

(75) Inventors: Robert Joel Stokes, Palm Harbor, FL (US); James J. Vitt, Palm Harbor, FL (US); Charles Clinton Conklin, New Port Richey, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 1144 days.

(21) Appl. No.: 12/240,683

(22) Filed: Sep. 29, 2008

(65) Prior Publication Data
US 2010/0079597 A1 Apr. 1, 2010

(51) Int. Cl.
*H04N 7/173* (2011.01)
*H04N 7/16* (2011.01)
(Continued)

(52) U.S. Cl.
CPC ............... *H04N 7/163* (2013.01); *H04H 60/32* (2013.01); *H04N 7/17309* (2013.01); *H04N 21/43615* (2013.01); *H04N 21/44222* (2013.01);
(Continued)

(58) Field of Classification Search
CPC .................................................. H04N 21/4425
USPC ........................ 725/80, 133, 9–15, 132, 140
See application file for complete search history.

(56) References Cited

U.S. PATENT DOCUMENTS 4,230,990 A  10/1980  Lert, Jr. et al.
4,658,290 A   4/1987  McKenna et al.

(Continued)

FOREIGN PATENT DOCUMENTS

DE    3742426    6/1989
EP    0843468    5/1998

(Continued)

OTHER PUBLICATIONS

Patent Cooperation Treaty, "International Search Report," issued by the International Searching Authority in connection with counterpart PCT application No. PCT/US1992/002211, mailed Jul. 20, 1992 (1 page).

(Continued)

*Primary Examiner* — Pankaj Kumar
*Assistant Examiner* — Reuben M Brown
(74) *Attorney, Agent, or Firm* — Hanley, Flight & Zimmerman, LLC

(57) ABSTRACT

Methods and apparatus for identifying the operating state of an audio-video (AV) device are described. Example methods and apparatus include monitoring messages transmitted via a data bus in a first AV device, wherein the data bus is communicatively coupled to a processor and an AV network controller of the first AV device, and wherein the AV network controller is further communicatively coupled to a second AV device external to the first AV device. The example method also involves extracting messages associated with an operation of the second AV device from the monitored messages, analyzing the extracted messages for data associated with an operating state of the second AV device, and sending a command to the AV network controller to request data missing from the extracted messages and associated with the operating state of the second AV device. Additionally, the example methods and apparatus include identifying the operating state of the second AV device by analyzing the extracted messages and a response from the second AV device associated with the command.

31 Claims, 8 Drawing Sheets

(51) Int. Cl.
*H04H 60/32* (2008.01)
*H04N 21/436* (2011.01)
*H04N 21/442* (2011.01)
*H04N 21/4425* (2011.01)
*H04N 5/445* (2011.01)

(52) U.S. Cl.
CPC ... *H04N21/44227* (2013.01); *H04N 21/44231* (2013.01); *H04N 21/4425* (2013.01)
USPC .............................. 725/80; 725/132; 725/140

(56) References Cited

U.S. PATENT DOCUMENTS

| | | | |
|---|---|---|---|
| 4,885,632 A | 12/1989 | Mabey et al. | |
| 4,905,080 A | 2/1990 | Watanabe et al. | |
| 4,907,079 A | 3/1990 | Turner et al. | |
| 4,943,963 A | 7/1990 | Waechter et al. | |
| 5,034,902 A | 7/1991 | Steinmann | |
| 5,251,324 A | 10/1993 | McMullan, Jr. | |
| 5,319,453 A | 6/1994 | Copriviza et al. | |
| 5,374,951 A | 12/1994 | Welsh | |
| 5,448,554 A | 9/1995 | Van Steenbrugge | |
| 5,481,294 A | 1/1996 | Thomas et al. | |
| 5,488,408 A | 1/1996 | Maduzia et al. | |
| 5,581,800 A | 12/1996 | Fardeau et al. | |
| 5,608,445 A | 3/1997 | Mischler | |
| 5,629,739 A | 5/1997 | Dougherty | |
| 5,630,203 A | 5/1997 | Weinblatt | |
| 5,631,995 A | 5/1997 | Weissensteiner et al. | |
| 5,787,334 A | 7/1998 | Fardeau et al. | |
| 5,844,636 A | 12/1998 | Joseph et al. | |
| 5,872,588 A | 2/1999 | Aras et al. | |
| 6,202,210 B1 | 3/2001 | Ludtke | |
| 6,389,403 B1 | 5/2002 | Dorak, Jr. | |
| 6,400,996 B1 | 6/2002 | Hoffberg et al. | |
| 6,405,370 B1 | 6/2002 | Jarrell | |
| 6,460,018 B1 | 10/2002 | Kasai et al. | |
| 6,496,862 B1 | 12/2002 | Akatsu et al. | |
| 6,675,383 B1 | 1/2004 | Wheeler et al. | |
| 6,700,893 B1 * | 3/2004 | Radha et al. | 370/412 |
| 6,704,929 B1 | 3/2004 | Ozer et al. | |
| 6,779,198 B1 | 8/2004 | Morinaga et al. | |
| 6,792,469 B1 | 9/2004 | Callahan et al. | |
| 6,983,478 B1 | 1/2006 | Grauch et al. | |
| 7,359,528 B2 | 4/2008 | Rhoads | |
| 7,404,016 B2 * | 7/2008 | Emerson et al. | 710/22 |
| 7,690,017 B2 * | 3/2010 | Stecyk et al. | 725/80 |
| 7,827,319 B2 * | 11/2010 | Kimura et al. | 710/5 |
| 8,526,626 B2 | 9/2013 | Nielsen et al. | |
| 8,763,022 B2 | 6/2014 | Ramaswamy | |
| 2001/0007149 A1 | 7/2001 | Smith | |
| 2002/0010919 A1 | 1/2002 | Lu et al. | |
| 2002/0059577 A1 | 5/2002 | Lu et al. | |
| 2002/0073419 A1 | 6/2002 | Yen et al. | |
| 2002/0078441 A1 | 6/2002 | Drake et al. | |
| 2002/0129368 A1 | 9/2002 | Schlack et al. | |
| 2002/0173911 A1 | 11/2002 | Brunet et al. | |
| 2002/0194592 A1 | 12/2002 | Tsuchida et al. | |
| 2003/0005432 A1 | 1/2003 | Ellis et al. | |
| 2003/0023967 A1 | 1/2003 | Kim | |
| 2003/0041141 A1 | 2/2003 | Abdelaziz et al. | |
| 2004/0116067 A1 | 6/2004 | Karaoguz et al. | |
| 2004/0254887 A1 | 12/2004 | Jacoby | |
| 2005/0066210 A1 | 3/2005 | Chen | |
| 2005/0086334 A1 | 4/2005 | Aaltonen et al. | |
| 2005/0278731 A1 | 12/2005 | Cameron et al. | |
| 2005/0289613 A1 * | 12/2005 | Lawrence | 725/80 |
| 2006/0075420 A1 | 4/2006 | Ludvig et al. | |
| 2006/0075421 A1 | 4/2006 | Roberts et al. | |
| 2007/0053513 A1 | 3/2007 | Hoffberg | |
| 2007/0186229 A1 * | 8/2007 | Conklin et al. | 725/14 |
| 2008/0025707 A1 * | 1/2008 | Sawada et al. | 386/126 |
| 2008/0056675 A1 | 3/2008 | Wright et al. | |
| 2008/0082661 A1 | 4/2008 | Huber | |
| 2008/0098426 A1 | 4/2008 | Candelore | |
| 2008/0120440 A1 | 5/2008 | Balasubramanian et al. | |
| 2008/0148307 A1 | 6/2008 | Nielsen et al. | |
| 2008/0244680 A1 * | 10/2008 | Mochizuki | 725/133 |
| 2008/0263579 A1 | 10/2008 | Mears et al. | |
| 2009/0178087 A1 * | 7/2009 | Menn et al. | 725/86 |
| 2009/0241148 A1 * | 9/2009 | Lo | 725/81 |
| 2014/0250449 A1 | 9/2014 | Ramaswamy | |

FOREIGN PATENT DOCUMENTS

| | | | |
|---|---|---|---|
| EP | 1100265 | 5/2001 | |
| EP | 1318676 | 6/2003 | |
| EP | 1586045 | 10/2005 | |
| FR | 2738977 | 3/1997 | |
| FR | 2745144 | 8/1997 | |
| GB | 2265736 | 10/1993 | |
| GB | 2406451 | 3/2005 | |
| JP | 2003323362 | 11/2003 | |
| WO | 9217027 | 10/1992 | |
| WO | 9417609 | 8/1994 | |
| WO | 9806193 | 2/1998 | |
| WO | 9831114 | 7/1998 | |
| WO | 0161892 | 8/2001 | |
| WO | 0165747 | 9/2001 | |
| WO | 2004051997 | 6/2004 | |
| WO | 2005079457 | 9/2005 | |
| WO | 2005079941 | 9/2005 | |
| WO | 2005125198 | 12/2005 | |
| WO | 2006012629 | 2/2006 | |
| WO | 2006014495 | 2/2006 | |
| WO | 2006020560 | 2/2006 | |
| WO | WO 2006/014495 | * 2/2006 | |
| WO | 2006037631 | 4/2006 | |
| WO | 2006055897 | 5/2006 | |
| WO | 2007048124 | 4/2007 | |

OTHER PUBLICATIONS

Patent Cooperation Treaty, "International Search Report," issued by the International Searching Authority in connection with counterpart PCT application No. PCT/US1998/000091, mailed Apr. 28, 1998 (2 pages).

Patent Cooperation Treaty, "International Search Report," issued by the International Searching Authority in connection with counterpart PCT application No. PCT/US2001/005104, mailed Sep. 28, 2001 (3 pages).

Patent Cooperation Treaty, "International Search Report," issued by the International Searching Authority in connection with counterpart PCT application No. PCT/US2002/038012, mailed May 22, 2003 (2 pages).

Patent Cooperation Treaty, "International Search Report," issued by the International Searching Authority in connection with counterpart PCT application No. PCT/US2005/005079, mailed Jun. 17, 2005 (2 pages).

Patent Cooperation Treaty, "International Search Report," issued by the International Searching Authority in connection with counterpart PCT application No. PCT/US2005/023995, mailed Dec. 23, 2005 (1 page).

Patent Cooperation Treaty, "International Search Report," issued by the International Searching Authority in connection with counterpart PCT application No. PCT/EP2005/010739, mailed Apr. 26, 2006 (4 pages).

Patent Cooperation Treaty, "International Search Report," issued by the International Searching Authority in connection with counterpart PCT application No. PCT/US2005/042108, mailed Aug. 17, 2006 (1 page).

Patent Cooperation Treaty, "International Search Report," issued by the International Searching Authority in connection with counterpart PCT application No. PCT/US2005/026426, mailed Aug. 18, 2006 (1 page).

Patent Cooperation Treaty, "International Search Report," issued by the International Searching Authority in connection with counterpart PCT application No. PCT/US2005/028106, mailed Mar. 12, 2007 (1 page).

(56) References Cited

OTHER PUBLICATIONS

Patent Cooperation Treaty, "International Search Report," issued by the International Searching Authority in connection with counterpart PCT application No. PCT/US2006/060118, mailed Mar. 14, 2008 (1 page).
Patent Cooperation Treaty, "International Search Report," issued by the International Searching Authority in connection with counterpart PCT application No. PCT/US2005/005064, mailed Sep. 25, 2008 (1 page).
Svenska Elektriska Kommissionen, SEK, English language translation of "Domestic and Similar Electronic Equipment Interconnection Requirements: AV.Link," Serial No. SS-EN 50157-1, Jul. 1998 (20 pages).
Svenska Elektriska Kommissionen, SEK, English language translation of "Domestic and Similar Electronic Equipment Interconnection Requirements: AV.Link," Serial No. SS-EN 50 157-2-1, Apr. 1996 (33 pages).
Svenska Elektriska Kommissionen, SEK, English language translation of "Domestic and Similar Electronic Equipment Interconnection Requirements: AV.Link," Serial No. SS-EN 50157-2-2, Aug. 1998 (18 page).
Svenska Elektriska Kommissionen, SEK, English language translation of "Domestic and Similar Electronic Equipment Interconnection Requirements: AV.Link," Serial No. SS-EN 50157-2-3, Aug. 1998 (12 pages).
Friess, Steve, "Nielsen, TiVo Try Ratings Game," www.wired.com, Sep. 13, 2002 (2 pages).
NXP Semiconductors, Product Data Sheet of "TDA 9950 CEC/PC-bus Translator," released on Nov. 16, 2007 (24 pages).
BPR, Ltd., "The Scart Connector," 2003 (6 pages).
Boccaccio, Jeff, "Inside HDMI CEC: The Little-Known Control Feature," Dec. 28, 2007 (7 pages).
Jones et al., "CEC-Enabled HDMI System Design for Multi-Vendor Compatibility," www.videsignline.com, Jun. 20, 2008 (9 pages).
Gardiner et al., "Digital Television Project Provision of Technical Assistance, Preliminary Investigation of a SCART Lead Benchmarking Scheme," DTG Management Services, Ltd., Feb. 7, 2005 (27 pages).
Belinfante et al., "Specification Based Formal Testing: The EasyLink Case Study," University of Twente, Enschede, N.L., and Philips Research, Eindhoven, N.L., published in 2001 (10 pages).
"Designing EC into Your Next HDMI Product," www.quantumdata.com (11 pages).
Hitachi, Ltd. et al., "High-Definition Multimedia Interface, Specification Version 1.3a," Nov. 10, 2006 (276 pages).

\* cited by examiner

|     | 600 | 602 | 604 | 606 | 608 |
| --- | --- | --- | --- | --- | --- |
| 610 | DEVICE | POWER | VIDEO SOURCE | AUDIO SOURCE | CURRENT MODE |
| 612 | TV | ON | DVDR | DVDR | AUDIO MUTE |
| 614 | DVDR | ON | DVDR | DVDR | PLAY |
| 616 | SET TOP BOX | ON | CHANNEL 11 | CHANNEL 11 | |
| 618 | AMPLIFIER | ON | N/A | DVDR | LEVEL = 20% |
|     | GAME SYSTEM | ON | N/A | N/A | PAUSE |

FIG. 6A

| | DEVICE | POWER | VIDEO SOURCE | AUDIO SOURCE | CURRENT MODE |
| --- | --- | --- | --- | --- | --- |
| 620 | TV | ON | SET TOP BOX | SET TOP BOX | LEVEL = 40% |
| 622 | DVDR | ON | DVDR | DVDR | PLAY |
| 624 | SET TOP BOX | STANDBY | N/A | N/A | |
| 626 | AMPLIFIER | ON | N/A | SET TOP BOX | LEVEL = 5% |

FIG. 6B

|     | 622 | | | | |
| --- | --- | --- | --- | --- | --- |
| 628 | DEVICE | POWER | VIDEO SOURCE | AUDIO SOURCE | CURRENT MODE |
| 630 | TV | ON | UNKNOWN | UNKNOWN | LEVEL = 5% |
| 632 | DVDR | ON | SET TOP BOX | SET TOP BOX | RECORD |
| 634 | SET TOP BOX | ON | CHANNEL 5 | CHANNEL 5 | |
| 636 | AMPLIFIER | ON | N/A | UNKNOWN | LEVEL = 30% |
|     | GAME SYSTEM | ON | N/A | N/A | PLAY |

FIG. 6C

METHODS AND APPARATUS FOR DETERMINING THE OPERATING STATE OF AUDIO-VIDEO DEVICES

FIELD OF THE DISCLOSURE

This patent relates generally to audience measurement and, more particularly, to determining the operating state of audio-video devices.

BACKGROUND

Media ratings and metering information is typically generated by collecting viewing records or other media consumption information from a group of statistically selected households. Each of the statistically selected households typically has a data logging and processing unit commonly referred to as a "home unit." In households having multiple viewing sites (e.g., multiple television systems or, more generally, multiple media presentation devices), the data logging and processing functionality may be distributed among a single home unit and multiple site units, where one site unit may be provided for each viewing site, location or area. The home unit (or the combination of the home unit and the site units) is often in communication with a variety of attachments that provide inputs to the home unit or receive outputs from the site unit to gather data from the audio-video (AV) devices at the selected site.

Available AV devices are becoming more complex in functionality and interoperability with other AV devices. As a result, manufacturers are exploring new, user-friendly ways of standardizing interfaces to simplify for the user the set-up and operation of these devices. For example, High-Definition Multimedia Interface-Consumer Electronic Control (HDMI-CEC) simplifies the setup and operation of an otherwise complex arrangement of AV network devices An AV network configured in this manner is typically monitored using hardware, firmware, and/or software to interface with the AV devices to extract or to generate signal information that may be used to determine viewing habits. Many AV networks are also configured so that the AV devices coupled to the network may be powered independently. As a result, a set top box, for example, may be powered on while a television associated with the set top box is off. Thus, monitoring AV networks having independently powered devices typically involves an additional device or method to determine the operating state of the television set to ensure that the collected data reflects media information actually viewed or consumed.

In addition, building security and building monitoring systems, which may use a variety of AV devices, are becoming more prevalent. Such systems enable a building owner to determine the state of various electronic appliances in the building, even when the building owner is located remotely from the building premises. In many instances, the building owner may desire to know the operating state, e.g., on state or off state, of a particular appliance such as a television or other media delivery/presentation device. In another setting, parents often have an interest in monitoring their children's television viewing habits, electronic gaming habits, and computer usage habits. A component of monitoring such habits involves determining the on or off state of the appliance, electronic device, etc. of interest.

BRIEF DESCRIPTION OF THE DRAWINGS

FIGS. 6A-C depict example device operating state combinations that may be encountered on an AV network.

DETAILED DESCRIPTION

Figure 1:
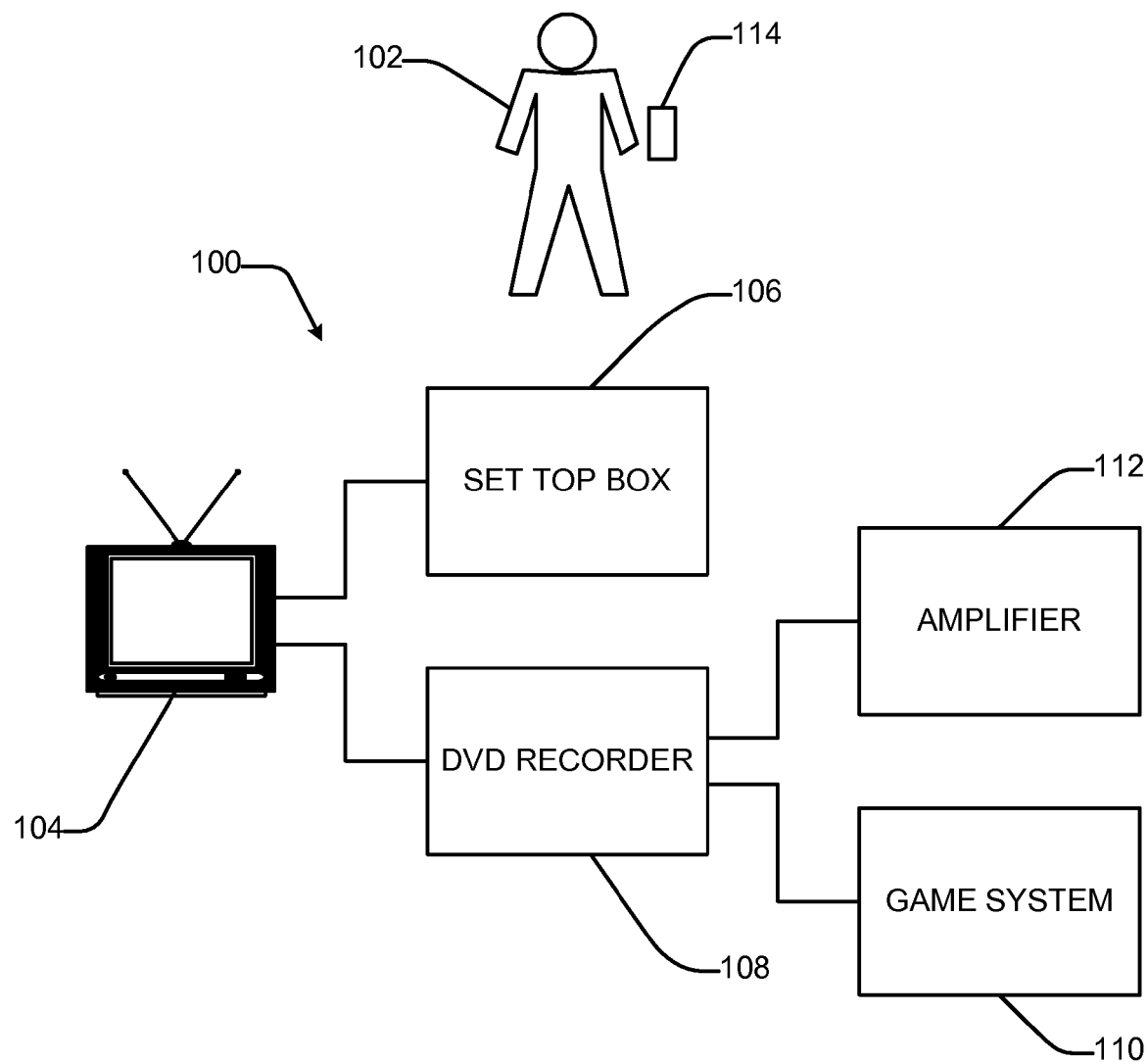
FIG. 1 is a block diagram representation of an example AV network, in which the example operating state identifier methods and apparatus described herein can be employed.

Certain examples are shown in the above-identified figures and described in detail below. In describing these examples, like or identical reference numbers may be used to identify common or similar elements. Although the example systems described herein include, among other components, software executed on hardware, such apparatus is merely illustrative and should not be considered as limiting. Any or all of the disclosed components could be embodied exclusively in hardware, exclusively in software, exclusively in firmware or in some combination of hardware, firmware or software.

For media ratings to have value to advertisers or producers of media content, metering data used to generate the ratings must provide an accurate representation of the viewing habits of persons in metered environments (e.g., households). Generating accurate metering data has become more difficult as the audio-visual (AV) devices presenting media content in metered households have become more complex in functionality and interoperability. To reduce the complexity of connecting and operating the AV devices, AV device manufacturers have developed AV network protocols (e.g., HDMI-CEC) for transmitting digital messages between AV devices.

Messages transmitted via an AV network convey information between devices related to the operating states of the devices (e.g., power status, tuning status, record and playback information and remote control information). The message data transmitted via an AV network may be utilized (e.g., extracted and analyzed) to identify the operating states of AV devices that are coupled to the AV network and which are presenting media content to people in metered households or other monitored environments. Proper identification of the operating states of AV devices is crucial in ensuring that the metering data collected accurately reflects consumption of media content by persons and, as a result, ensuring that the data may be used to produce media ratings with value to advertisers or producers of media content.

The example methods and apparatus described herein may be used to identify operating states (e.g., on/off power status) of AV devices (e.g., televisions, set top boxes, digital video disc recorders, etc.) connected to or otherwise communicatively coupled to an AV network. The AV devices on an AV network may power up independently, may include multiple functionalities within one device (e.g., a tuner, digital video recording and/or playback, etc.) and may have multiple audio and video source inputs or outputs. Multiple media presentation devices of a particular type (e.g., televisions) may also exist on the AV network.

In general, the example methods and apparatus described herein identify the operating states of AV devices on an AV network by identifying the on or off status of the AV devices, the audio and video sources supplying the media content to a media presentation device and/or viewing modes (e.g., play, fast forward, reverse, pause, etc.) of each of the AV devices. Additionally, the example methods and apparatus may identify the operating state of an AV device by analyzing the operating state of a plurality of AV devices on the AV network. For example, if multiple AV devices on an AV network are identified to be in an operating state associated with supplying media content to a person, the operating states of each AV device may be further analyzed to determine which of the AV devices are in an operating state indicating that the AV device is actually or actively supplying media content to the person viewing the media presentation device.

More specifically, the example methods and apparatus described herein identify the operating state of an AV device by monitoring and analyzing messages transmitted on a bus (e.g., an Inter-Integrated Circuit bus) communicatively coupled between a processor and an AV network controller within a first AV device. An example method and apparatus described in more detail below monitors a bus, extracts messages associated with an operation of a second AV device, analyzes the extracted messages to determine whether further information is needed to identify the operating state of the second AV device, and requests missing information from the second AV device. The example method and apparatus may then identify the operating state of the second AV device by analyzing the extracted messages along with the information requested from the second AV device.

In one example implementation, a message monitor is implemented within a first AV device (e.g., a set top box) and configured to monitor messages associated with the operation of a second AV device (e.g., a digital video disc recorder (DVDR)). The message monitor monitors messages transmitted on a bus between a processor and a network controller within the first AV device. An extractor then extracts messages associated with the operation of the second AV device such as, for example, a power-on command sent to a DVDR or various playback operations (e.g., play or fast forward) associated with the DVDR. An analyzer analyzes the extracted messages to identify missing information that may be needed to identify the operating state of the second AV device and commands a requester to send a message to the second AV device requesting the missing information. Once the requested missing information is extracted from the bus, an identifier identifies the operating state of the second AV device. This example implementation may be used to identify the operating state of every AV device located on the AV network. Alternatively or additionally, the example implementation may identify the operating state of the second AV device by analyzing the operating states of a plurality of AV devices connected to the AV network.

FIG. 1 shows an example home audio-video (AV) network 100 that may be used to present media content to one or more respondents, panel members, or persons, etc., one of which is designated with the reference numeral 102. In this example, a television 104 is connected via the AV network 100 which, for example, may be implemented as an HDMI-CEC protocol compliant network, to one or more AV devices including, but not limited to, a set top box (STB) 106, a digital video disc recorder (DVDR) 108, a game system 110 and an amplifier 112. HDMI-CEC is only one example AV network protocol that may be used in conjunction with the example methods and apparatus described herein. Thus, many other network protocols could be used instead, such as Syndicat Français des Constructeurs d'Appareils Radio et Television (SCART). The person(s) 102 may interface with the devices connected to the AV network 100 in many ways, one of which is through the use of one or more remote control devices 114 (e.g., infrared (IR) and/or radio frequency (RF) remote control devices). The remote control device(s) 114 may be designed to communicate with one or more AV devices from a single manufacturer or the remote control device(s) 114 may include a universal remote control designed to communicate with multiple or all of the AV devices connected in the AV network 100.

Before discussing the example methods and apparatus for determining the operating state of audio-video devices in detail, a brief discussion of the manners in which AV devices are connected to and communicate via an AV network is first provided below. Available AV devices, such as those depicted in FIG. 1, are becoming more complex in functionality and interoperability with other AV devices. As a result, manufacturers are exploring new, user friendly ways of standardizing interfaces to simplify for the user the setup and operation of these devices. For example, HDMI-CEC is one AV network protocol that simplifies the setup and operation of an otherwise complex arrangement of AV network devices. However, HDMI-CEC is only one example of a network protocol and many other well-known protocols could be used, such as the various implementations of AV.link including EasyLink and SmartLink. One particular example of a simplified interface is the one-button-play feature that enables a user to activate one button or control to cause devices coupled to an AV network to be powered on, select the proper media source, and begin playing the media content.

To enable an AV network to provide features such as one-button-play functionality and other high level control functions, each AV device connected to the AV network must be able to address directly all other AV devices on the AV network. To accomplish this, each AV device on the network is assigned a physical address and a logical address. For example, when an AV device is added to the AV network, the AV device is assigned a physical address corresponding to its physical location on the AV network and a logical address corresponding to the functionality of the device. If an AV device connected to the AV network does not fully support the protocol utilized in the AV network, the AV device may be assigned a physical address but not a logical address. Multiple methods of addressing could be used and one such example is set forth in the High-Definition Multimedia Interface specification, version 1.3 provided through HDMI Licensing, LLC, the entire disclosure of which is incorporated herein by reference.

An HDMI-CEC network is created through the interconnection of two or more HDMI-CEC compliant devices. Physical addresses are assigned to an AV device on the HDMI-CEC network according to the location at which the AV device is connected to the AV network and are used to ensure that media content is routed correctly from a source AV device (e.g., a DVDR) to a media presentation device (e.g., a television). The root device of the AV network (e.g., a television) is always assigned the physical address 0.0.0.0. A first AV device on the AV network may have one or more ports available for connecting a second AV device to the AV network. The physical address of the second AV device is created by incorporating the physical address of the first AV device and the number of the port of the first AV device to which the second AV device is connected. For example, a second AV device may be connected to port 2 of a first AV device having the physical address of 1.2.0.0 and, therefore, the second AV device may be assigned the physical address of 1.2.2.0.

Another method of addressing AV devices on an AV network uses logical addressing based on the functionality (e.g., television, tuner, recording device, playback device or audio system) of the AV device. An AV device may incorporate one or more functionalities such as, for example, a STB may have two tuners and two digital recording devices implemented internally. Each functionality type (e.g., recording device or tuner) implemented within a device is assigned a logical address. However, if an AV device contains multiple instances associated with a functionality, the AV device may only be assigned one logical address of that functionality, and the AV device may be required to manage the multiple instances of functionality internally. In the above-mentioned STB example, the STB may be assigned a physical address of 1.2.0.0, a logical address for a tuner and another logical address for a recording device. The STB may then manage second instances of a tuner and a recording device internally.

HDMI-CEC is an AV device network communication protocol designed to be implemented using a single wire, multi-drop bus for which all messages transferred via the AV network (i.e., via the single wire bus) are received substantially simultaneously by all AV devices on the AV network. The messages transmitted via the AV network contain fields that indicate the message source (e.g., the logical address of the AV device sending the message), the message destination (e.g., the logical address of the AV device intended as the recipient of the message) and an operation code (e.g., a command to the destination device or request for status information). Some messages (e.g., broadcast messages) contain a message destination that indicates that all AV devices on the AV network are the intended recipients of the messages. The AV devices indicated as the message destination process the operation code sent in the message and reply to the AV device indicated as the message source.

Figure 2:
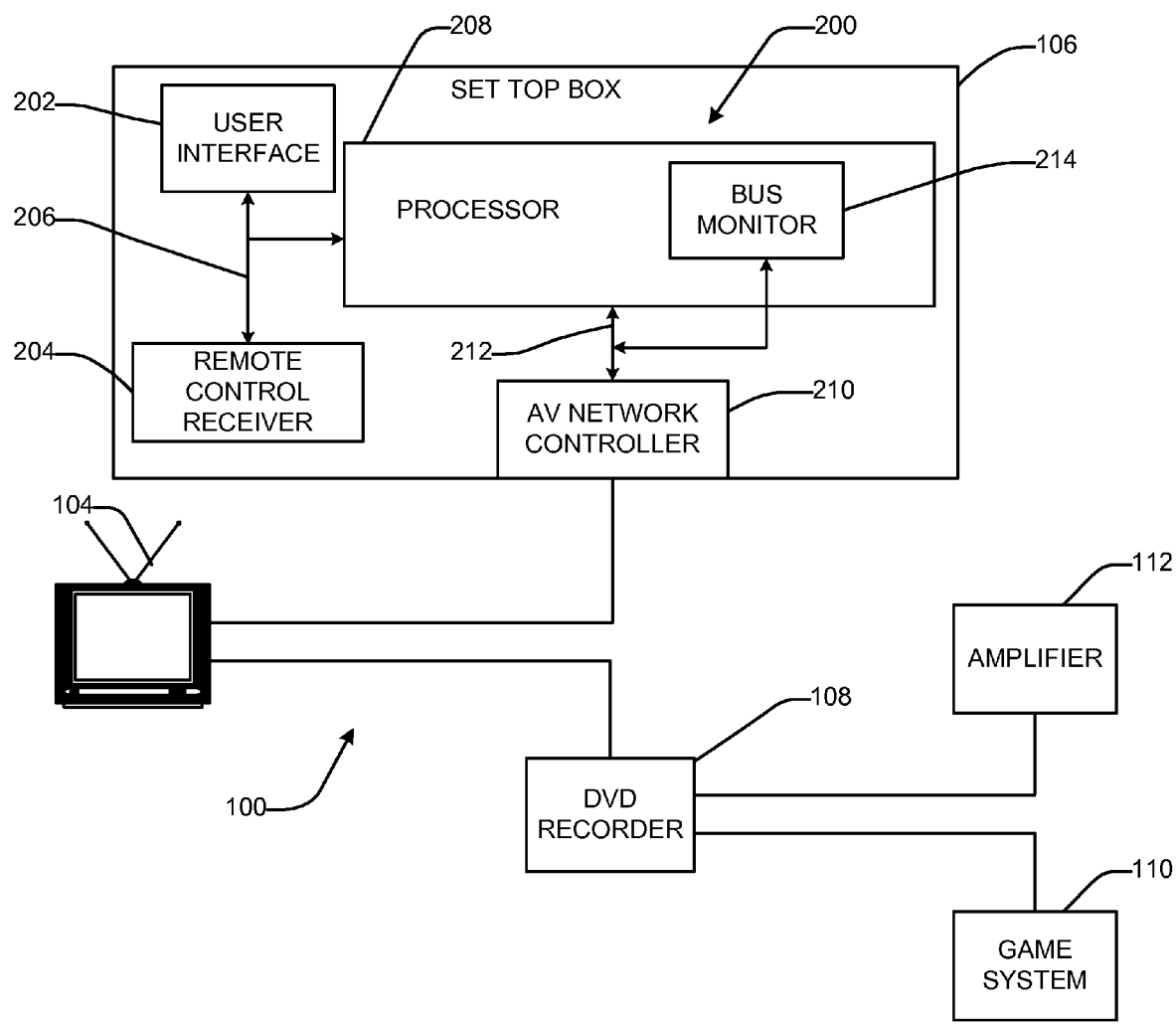
FIG. 2 is a block diagram representation of an example operating state identifier system that may be implemented within the set top box depicted in FIG. 1.

FIG. 2 is a block diagram representation of an operating state identifier system 200 that may be implemented within the STB 106 of FIG. 1. The example system 200 is depicted as implemented within the STB 106 but could be implemented within any device connected to the AV network 100.

In the example implementation illustrated in FIG. 2, the STB 106 may include a user interface 202 that may include one or more push buttons, keys, switches, knobs, etc. to provide signal inputs and/or commands to the STB 106. The user interface 202 may also include a liquid crystal display to provide visual feedback to a user (e.g., the person 102). The STB 106 may also include a remote control receiver 204 to receive signals (e.g., infrared or radio frequency) containing commands and/or other information transmitted by the remote control device 114. Commands and/or other information received via the user interface 202 and/or the remote control receiver 204 are conveyed via a data bus 206 to a processor 208. The person 102 may use the remote control device 114 (e.g., a universal remote control) that transmits to the STB 106 commands and/or other information intended to be transmitted via the AV network 100 to another AV device (e.g., the DVDR 108). The processor 208 controls the operation of the STB 106 based on the commands and/or other information received via the data bus 206.

The STB 106 may also send and receive commands and/or other information via the AV network 100 with an AV network controller 210. The AV network controller 210 is capable of exchanging commands and/or other information with other AV network devices (e.g., the television 104, the DVDR 108, etc.) via the AV network 100 using communications compliant with any desired protocol such as, for example, HDMI-CEC. The AV network controller 210 may be implemented within in a single integrated circuit, with multiple integrated circuits or combined within an integrated circuit with other functionality. The processor 208 and the AV network controller 210 communicate via a bus 212, which may be implemented as an Inter-Integrated Circuit ($I^2C$) bus or any other bus capable of transmitting data between integrated circuits. Commands received by the remote control receiver 204 and/or the manual user interface 202 may be processed by the processor 208 and transferred via the bus 212 or via an additional data bus such as the data bus 206. Although the data busses 206 and 212 are depicted as separate busses, the functionality of these busses may be implemented using a single bus. The example system 200 also includes a bus monitor 214 implemented within the processor 208 and is designed to extract messages conveyed between networked AV devices via the bus 212.

In the illustrated example, the operating state identifier system 200 implemented within the STB 106 is configured to identify the operating state of any AV device communicatively coupled to the AV network 100. The operating state identifier system 200 identifies the operating state of an AV device by monitoring messages transmitted via the bus 212, extracting messages transmitted via the bus 212 between the processor 208 and the AV network controller 210, analyzing the extracted messages and requesting any missing information associated with the operating state of the AV device. The operating state identifier system 200 may identify the operating state of an AV device on the AV network 100 by analyzing the extracted messages along with any missing information returned by the AV device.

To examine the illustrated example in more detail, the operating state identifier system 200 may be used to identify the operating state of an AV device (e.g., the DVDR 108) on the AV network 100 that is actively providing media content to a media presentation device (e.g., the television 104) consumed (e.g., viewed and/or listened to) by a person. Further, the operating state identifier system 200, as illustrated, is implemented within the processor 208 of the STB 106, but could be implemented within a processor within any device communicatively coupled to the AV network 100.

A person (e.g., the person 102) may interact with the STB 106 via the user interface 202 (e.g., by operating buttons, keys, switches or knobs) or via a remote control device 114 via the remote control receiver 204, or a combination of these interfaces. The remote control device 114 (FIG. 1), for example, may be a universal remote control capable of communication with one or more AV devices (e.g., the television 104 and/or the DVDR 108) connected to the AV network 100. Commands and/or messages received via the user interface 202 or the remote control receiver 204 are transmitted via the bus 206 to the processor 208 for processing. For example, the processor 208 may process a command to determine whether the command is intended to be received and processed by the STB 106 or further transmitted via the AV network 100 to another AV device for processing. If the command is transmitted to another AV device (e.g., the DVDR 108), the processor 208 conveys a message to the AV network controller 210 via the bus 212 that includes the DVDR 108 as the message destination. As noted above, the busses 212 and 206 are shown as independent busses, but the functionality of these busses may be implemented within a single bus.

Figure 3:
FIG. 3 depicts an example sequence of events that may be monitored on the AV network depicted in FIGS. 1 and 2.

All AV devices connected to the AV network 100 receive commands and/or messages conveyed via the AV network 100, but only an AV device (e.g., the DVDR 108) indicated as the message destination device processes the message and responds to the source AV device (e.g., the STB 106). FIG. 3, discussed in detail below, illustrates an example sequence of messages that may be conveyed via the AV network 100.

The bus monitor 214, in this example implemented within the processor 208, monitors communications (e.g., messages) conveyed on the bus 212 and extracts information associated with the commands and/or messages conveyed between the AV network controller 210 and the processor 208. The commands and/or messages may be associated with the operation of any device communicatively coupled to the AV network 100, including the STB 106.

Further, the bus monitor 214 analyzes the extracted messages and may request missing information that may be used to identify the operating state of an AV device. The missing information may include, but is not limited to, commands provided to the AV device through the user interface 202 or messages transmitted through a remote control directly to the AV device and not conveyed via the AV network 100. For example, the person 102 (FIG. 1) may select a channel of a tuner implemented within the STB 106 via a button on the user interface 202. The bus monitor 214, for example, may request the missing information as a result of the analysis performed on the extracted messages or at predetermined time intervals. The bus monitor 214 then identifies the operating state of the AV device (e.g., the DVDR 108) by analyzing the extracted messages along with the missing information received in response to the request.

As noted above, FIG. 3 illustrates an example sequence of events (e.g., messages in response to user actions) that may be monitored on the AV network 100 of FIGS. 1 and 2 by the bus monitor 214. A person may generate a sequence of events as the person interacts with an AV device on the AV network 100. For example, the person 102 (FIG. 1) sends commands (e.g., play, stop, fast forward, etc.) to the STB 106 via the remote control device 114 to view media content from the DVDR 108 on the television 104. The example sequence of events may be extracted from the bus 212 by the bus monitor 214 as a sequence of messages associated with the operation of the DVDR 108. The bus monitor 214 may then analyze the extracted messages for missing information associated with the operation of the DVDR 108 and then request the missing information from the DVDR 108. Once the bus monitor 214 receives the requested missing information, the bus monitor 214 may then identify the operating state of the DVDR 108 by analyzing the extracted event messages along with any missing information received from the DVDR 108.

The messages transmitted via the AV network 100 contain fields that indicate the message source (e.g., the logical address of the AV device sending the message), the message destination (e.g., the logical address of the AV device intended as the recipient of the message) and an operation code (e.g., a command to the destination device or a request for status information). Additionally, the operation code field may contain additional, optional data for describing the operation code. In the example events of FIG. 3, the information displayed in a header column 300 contains representations of message sources and message destinations. As shown in the header column 300, the messages may be sent from the source AV device to a single destination AV device (e.g., the television 104 to the DVDR 108), or from the source AV device to all AV devices connected to the AV network 100 (e.g., the television 104 to all). An operation code and optional data column 302 contains representations of operation codes and any optional data further describing the operation codes (e.g., provide power status or report power status—standby to on).

Turning in more detail to the events in FIG. 3 and the example AV network 100 (FIG. 2), the bus monitor 214 monitors the communications via the bus 212 between the processor 208 and the AV network controller 210 to identify the operating state of a DVDR (e.g., the DVDR 108). In particular, the bus monitor 214 first extracts a message broadcast by the television 104 and indicating that the television 104 is in a standby state (event A) to every AV device connected to the AV network 100. The DVDR 108 provides media content to be viewed via the television 104. As a result, messages relating to the power status of the television 104 are extracted by the bus monitor 214 as part of the sequence of events. Next, the bus monitor 214 extracts messages that may be associated with a command (e.g., one-button-play) issued to the television 104 to display media content from the DVDR 108 (events B-D). The bus monitor 214 extracts messages where the television 104 initiates communication with the DVDR 108 by commanding an exchange of vendor identification information and requesting the power status of the DVDR 108 (event B). The bus monitor 214 then extracts the message indicating that the DVDR 108 has reached the on state (event C). The DVDR 108 then transmits messages to the television 104 to indicate that playback has begun (e.g., Deck Status (Play)) and to indicate to the television 104 to activate the DVDR 108 as the media source device and display the supplied media content (event D).

The bus monitor 214 may use Events A-D of FIG. 3 to identify the operating state of the DVDR 108 as supplying media content that is actively being consumed via the television 104. However, a person 102 may interact directly with the user interfaces of the television 104 and/or the DVDR 108 to modify commands sent to and/or the operation of these devices. In that case, the bus monitor 214 may request further information from the AV devices on the network (events E-J). The messages extracted indicate various playback operations (e.g., play, stop and search forward or reverse) that may be encountered during a typical media content playback session. These operations provide further information to the bus monitor 214 useful in identifying the operating state of the DVDR 108 to be playing media content actively consumed by the person 102 via the television 104. The messages associated with the events E-J may be extracted from messages transmitted via the bus 212 in response to remote control commands or may be returned in response to requests for missing information (e.g., the person 102 entering commands via the user interface 202). For example, the bus monitor 214 may further request the information associated with active source devices for the audio and video content of the television 108.

Finally, the bus monitor 214 may further identify another operating state of the DVDR 108 as messages extracted indicate that the user has finished viewing the media content (events J-L). The messages extracted indicate that the disc tray was opened (event J) and closed without media installed (event K) and that the DVDR 108 was transitioned from an on state to a standby state (event L), which the bus monitor 214 may use to identify the operating state of the DVDR 108 as standby without media installed.

Figure 4:
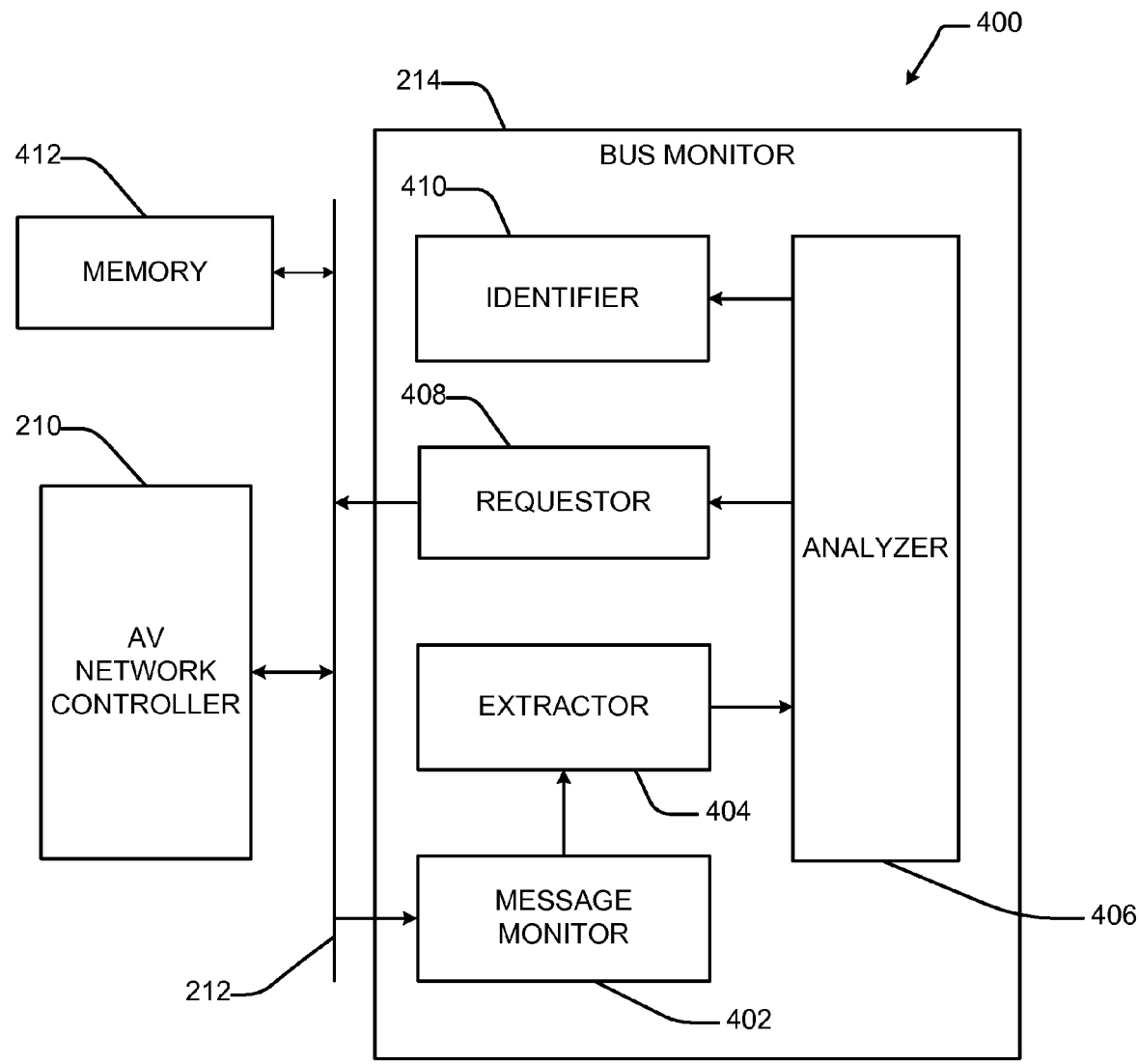
FIG. 4 is a more detailed representation of the example operating state identifier system shown in FIG. 2.

FIG. 4 is a block diagram representation of an example apparatus 400 that may be used to implement a method for determining the operating state of an AV device. In the illustrated example, the example apparatus 400 includes a message monitor 402, an extractor 404, an analyzer 406, a requestor 408 and an identifier 410. The apparatus 400, as shown, is an example implementation of the bus monitor 214 within the processor 208 (FIG. 2) that is communicatively coupled to the AV network controller 210 and a memory 412 via the bus 212. The example apparatus 400 may be implemented using any desired combination of hardware, firmware and/or software. For example, one or more integrated circuits, processing devices, discrete semiconductor components and/or passive electronic components may be used.

The example apparatus 400 includes the message monitor 402 to monitor the communications or messages between the AV network controller 210 (FIG. 2) and the processor 208 (FIG. 2) for messages associated the AV network 100. The message monitor 402 is coupled to the extractor 404, which may be configured to extract messages relating to an operation of an AV device (e.g., the DVDR 108) coupled to the AV network 100. The analyzer 406 analyzes the extracted messages to identify events relating to the operating state of a targeted AV device and determines whether any information that may be needed to identify the operating state of the targeted AV device is missing. For example, the analyzer 406 may analyze the temporal sequence of the messages and identify periods where messages may have been expected but none were extracted and determine that information is associated with commands that may have been entered via another user interface (e.g., the user interface 202 of FIG. 2) is missing. The analyzer 406 may also be implemented is such a manner that commands entered by a person (e.g. the person 102 of FIG. 1.) via the user interface are classified as missing information. The analyzer 406 may trigger the requester to request information in relation to any possible commands that are entered via the user interface 202 on a periodic basis. Additionally, the message monitor 402 may miss a message or the message may become corrupted during transmission via the AV network 100 or the bus 212. In the case where the analyzer 406 determines a message may have been missed or may have become corrupted, the analyzer 406 may classify the missing information to be requested by the requester 408.

The requester 408 requests the missing information identified by the analyzer 406 from the targeted AV device. The identifier 410 is configured to identify an operating state of the targeted AV device by analyzing the extracted messages and the responses from the AV device providing the missing information requested by the requester 408. The memory 412 is also in communication with the example apparatus 400. The memory 412 may be a non-volatile memory (e.g., flash memory), a mass storage device (e.g., a disk drive), a volatile memory (e.g., static or dynamic random access memory) or any combination of the enumerated memory types.

Figure 8:
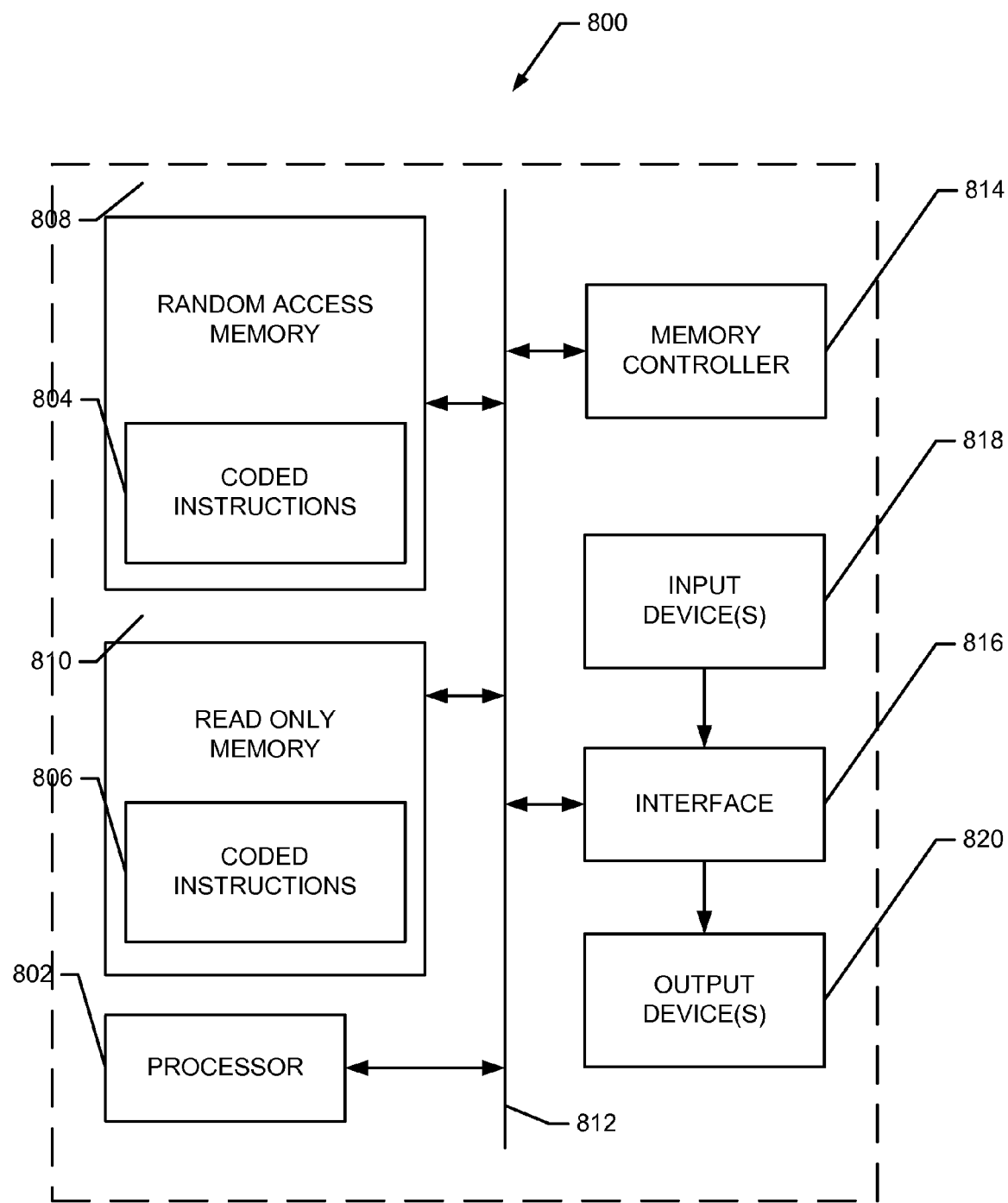
FIG. 8 is a block diagram representation of an example processor system that may be used to implement the example methods and apparatus described herein.

Some or all of the message monitor 402, the extractor 404, the analyzer 406, the requester 408, the identifier 410 or parts thereof, may be implemented using instructions, code, and/or other software and/or firmware, etc. stored on a machine accessible medium that are executed by, for example, a processor (e.g., the processor 800 of FIG. 8). When any of the appended claims are read to cover a purely software and/or firmware implementation, at least one of the message monitor 402, the extractor 404, the analyzer 406, the requester 408 and/or the identifier 410 is hereby expressly defined to include a tangible medium (e.g., a memory, DVDR, CD, etc.) storing such software and/or firmware.

The example apparatus 400 may be implemented in the processor 208 (FIG. 2) that may be any type of processor (e.g., microprocessor, microcontroller, ASIC, RISC, etc.) capable of executing instructions that are stored in the memory 412 to perform the functions described in the bus monitor 214 of FIG. 2 and in further detail in FIG. 4 in connection with the example apparatus 400.

Figure 5:
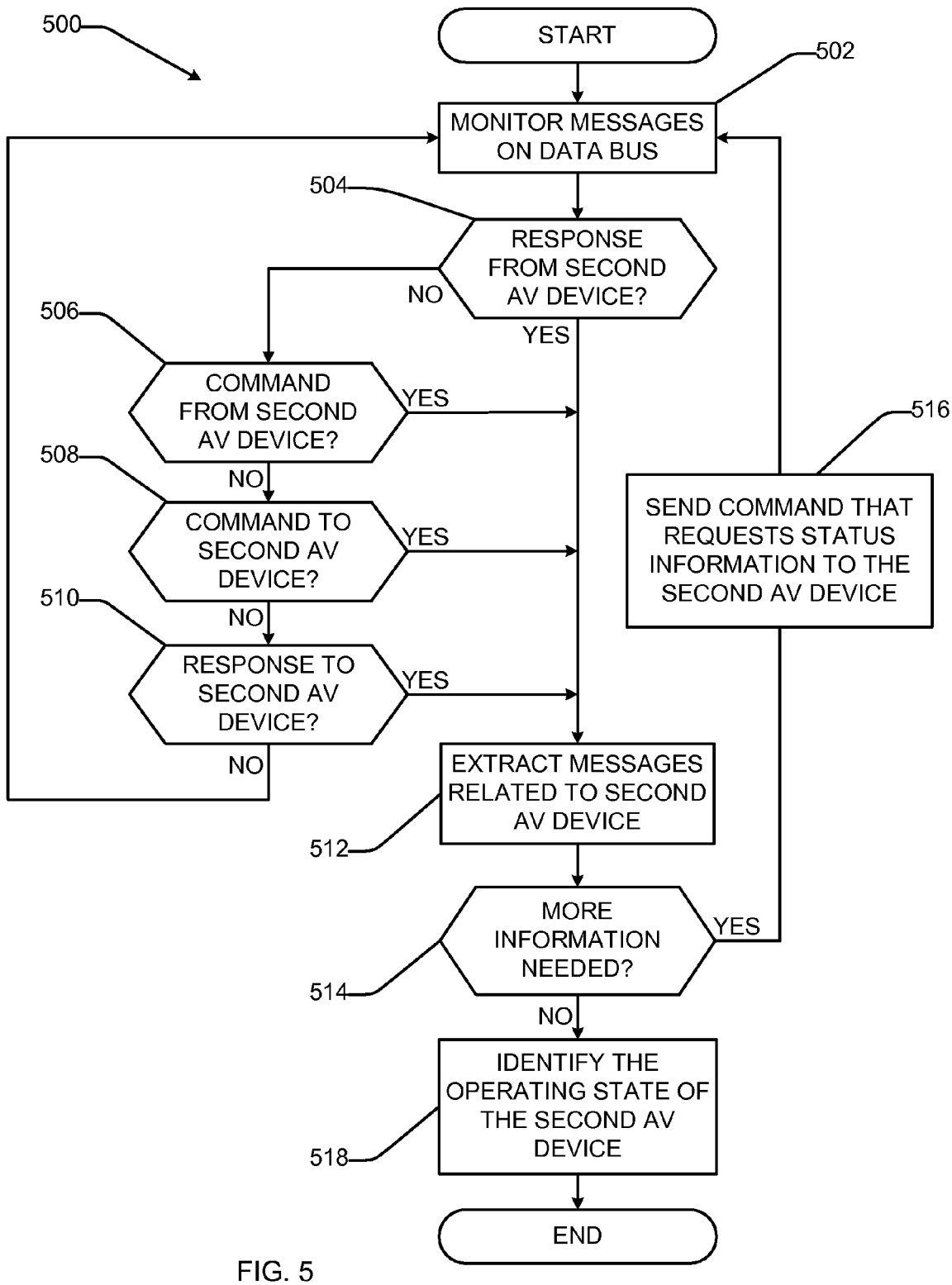
FIG. 5 is a flow diagram depicting operations that may be performed by the example operating state identifier system shown in FIGS. 2 and 4.
Figure 7:
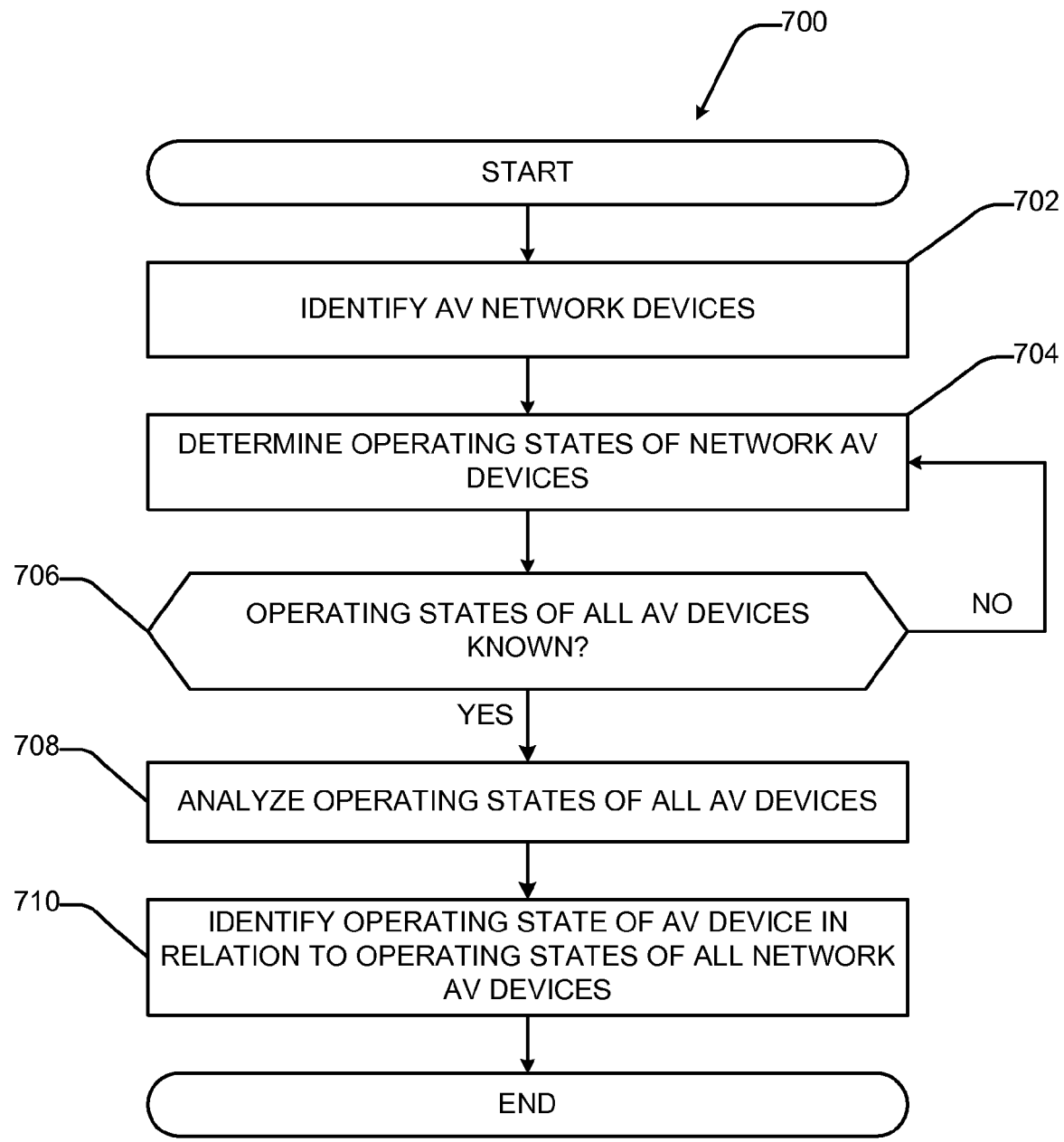
FIG. 7 is a flow diagram depicting one method by which the example operating state identifier apparatus described herein may use the operating states of network devices shown in FIGS. 6A-C to identify the operating state of a selected network device.

FIGS. 5 and 7 are flow diagrams representative of methods that may be performed by the example apparatus 400 of FIG. 4 to identify the operating state of AV devices connected to an AV network. The example methods or processes of FIGS. 5 and 7 may be performed using a processor, a controller and/or any other suitable processing device. For example, the example processes of FIGS. 5 and 7 may be implemented in coded instructions stored on a tangible medium such as a flash memory, a read-only memory and/or random-access memory associated with a processor (e.g., the example processor 208). Alternatively, some or all of the example operations of FIGS. 5 and 7 may be implemented using any combination of application specific integrated circuits (e.g., ASIC(s), field programmable logic devices), hardware, firmware, etc. In addition, some or all of the example operations of FIGS. 5 and 7 may be implemented in any combination of firmware, software or hardware. Further, although the example processes of FIGS. 5 and 7 are described with reference to the flowcharts of FIGS. 5 and 7, other methods of implementing the processes of FIGS. 5 and 7 may be employed. For example, the order of execution of the blocks may be changed or any or all of the blocks may be modified, eliminated or combined. Additionally, any or all of the example operations of FIGS. 5 and 7 may be performed sequentially and/or in parallel by, for example, separate processing threads, processors, devices, etc.

FIG. 5 is a flowchart depicting an example method 500 of determining the operating state of an AV device connected to the AV network 100 of FIG. 1. The method 500 may be implemented within a first AV device (e.g., the STB 106) and configured, for example, to identify an operating state of a second AV device (e.g., the DVDR 108) communicatively coupled to the first AV device via the AV network 100. Of course, the method 500 may be implemented within any device capable of communication via the AV network 100 and may be configured to identify the operating state of any device on the AV network 100, including the device in which the method 500 is implemented.

Initially, the message monitor 402 monitors communications on a data bus (e.g., the bus 212) communicatively coupling a processor (e.g., the processor 208) and an AV network controller (e.g., the AV network controller 210) for communications between AV devices (e.g., the television 104, the DVDR 108, the STB 106, etc.) on an AV network, such as the AV network 100 of FIG. 1 (block 502). The message monitor 402 then examines the monitored messages to determine whether they are related to the operation of the second AV device (e.g., the messages associated with the events in FIG. 3). First, the message monitor 402 determines whether a message is a response from the second AV device (block 504), if so, the extractor 404 extracts the message (block 512). If the message is not a response (block 504), the message is examined to determine whether the message is a command sent from the second AV device (block 506) and, if so, the extractor 404 extracts the message (block 512). If not, the message is examined to determine whether the message is a command sent to the second AV device (block 508) and, if so, the extractor 404 extracts the message (block 512). Finally, the message is examined to determine whether the message is a response sent to the second AV device (block 510), if so, the extractor 404 extracts the message (block 512). If the message is determined to not be a response sent to the second AV device, the message monitor 402 returns to monitoring the messages on the bus 212 for communications between AV devices (block 502). The extractor 404 may also store the messages in the memory 412 for later analysis for the operating state of a different AV device on the AV network 100.

The analyzer 406 analyzes the extracted messages to determine whether additional information may be needed to determine the operating state of the second AV device (block 514). If the analyzer 406 determines more information is needed, then the requester 408 conveys the request via the AV network controller 210 via the bus 212, which, in turn, conveys the request to the second AV device via the AV network 100 (block 516). The message monitor 402 and the extractor 404 continue to monitor the communications on the bus 212 and extract messages associated with the operation of the second AV device (blocks 502-512).

The analyzer 406 may determine that information associated with the operating state of the second AV device is missing through direct analysis of the messages extracted by the extractor 404. For example, the analyzer 406 may examine the temporal sequence of the extracted messages, identify periods where messages may have been expected but none were extracted, and determine that information associated with commands that may have been entered via another user interface (e.g., the user interface 202 of FIG. 2) is missing. The analyzer 406 may also be implemented in such a manner that commands entered by a person (e.g., the person 102 of FIG. 1.) via the user interface may always be classified as missing information. The analyzer 406 may trigger the requester 408 to request information related to any possible commands that may be entered via the user interface 202 (FIG. 2) on a periodic basis. Additionally, the message monitor 402 may miss a message or the message may become corrupted during transmission via the AV network 100 or the bus 212. In the case where the analyzer 406 determines a message may have been missed or may have become corrupted, the analyzer 406 may classify the information as missing to be requested by the requestor 408.

Once the analyzer 406 determines that no further information is needed to identify the operating state of the second AV device (block 514), the identifier 410 identifies the operating state of the second AV device by examining the extracted messages and the responses to the requests for missing information and stores the operating state data in the memory 412 (block 518). For example, the identifier 410 may analyze the messages shown in the events B-I of FIG. 3 and determine that the operating state of the DVDR 108 for that time period is on and presenting media content to a person as the DVDR 108 was powered on and requested to be the active source of the television (events B-D) and the DVDR 108 was actively controlled (events E-I). Additionally, the identifier 410 may identify the final operating state of the DVDR 108 as off with no media present through an examination of events J-L.

As mentioned above, the generation of media ratings with value to advertisers is an important goal for gathering accurate metering data at a metered household (e.g., the home of the person(s) represented by the person 102 of FIG. 1). As AV devices have become more complex, the gathering of metering data that accurately reflects the media content consumed (e.g., watched or listened to) by a viewer has also increased in complexity. While many newer AV devices may be connected via an AV network (e.g., HDMI-CEC), many metered households may contain AV equipment connected via an AV network, some of which may be further connected to older AV devices via other means (e.g., component video and audio connections). To generate accurate metering data, the operating states of individual AV devices on an AV network may be further analyzed to determine the operating state of an AV device in relation to the operating states of the connected AV devices. For example, the operating state of a DVDR may be found to be on and presenting media content. When further analyzed in relation to the other AV devices, the operating state of the DVDR may be found to be presenting media actually displayed on a television or presenting media content that is not displayed on the television.

FIGS. 6A-C contain information representing the operating states of multiple AV devices (e.g., a television, a DVDR, etc.) connected on an AV network (e.g., HDMI-CEC). A device column 600 lists each AV device connected via the AV network (e.g., the AV network 100 of FIG. 1). In this example, the devices include a television, a DVDR, an STB, an amplifier and a game system. A power column 602 represents the power state of each AV device (e.g., on or standby). A video source column 604 and an audio source column 606 represent the AV device supplying each of the individual sources, if applicable. A current mode column 608 contains additional information relevant to determining the operating state of the AV devices in relation to the media content presented that may be collected via the operating state identification process of FIG. 5.

FIG. 6A represents a listing of operating state data for the AV devices listed in the device column 600 (e.g., a television, a DVDR, an STB, an amplifier and a game system), and connected via an AV network (e.g., the AV network 100 of FIG. 1). All of the AV devices are in a power-on state (column 602). The television has the audio and video sources both set to the DVDR, but the audio content is muted (row 610). The DVDR is playing recorded media content (row 612). The STB is providing media content associated with built-in tuner functionality (row 614). The amplifier is presenting the audio from the DVDR set to an audible level (row 616), and the game system is in a paused state (row 618).

If each AV device in the device column 600 of FIG. 6A is analyzed independently, uncertainty remains as to which AV device is providing the media content to a person consuming the media content. The video sources (column 604) of the AV devices may be analyzed in relation to the content presented by the television to determine that the operating state of the television is powered-on and presenting the content provided by the DVDR.

Another possible scenario is illustrated in FIG. 6B. The television is in a powered-on state with the audio and video sources configured from the STB (row 620). The DVDR is playing media content (row 622). The STB is in standby mode (row 624), and the amplifier in a powered-on state with the audio source from the STB with the audio level set at 40% (row 626). The identifier 410 of FIG. 4 may initially identify the television as presenting video content from the STB. However, with further analysis of the operating states of all AV network devices including the standby state of the STB, the identifier 410 may further identify the operating state of the television as powered-on, but not presenting video content. Some AV networks may allow removal and addition of AV devices from the network as is shown by the removal of the game system from FIG. 6B.

In FIG. 6C, the television is in a powered-on state with unknown audio and video sources with the volume level set low (row 628). The identifier 410 may identify the operating state as powered-on, but not presenting media content. The DVDR is recording media content provided by the STB that is providing media content from the tuner (rows 630 and 632). The amplifier is also presenting audio output from an unknown source (row 634). The game system is in the operating state of play (row 636). The television and amplifier are both identified as providing media content from an unknown source and the game system is in active play mode. In the example AV network represented in FIG. 6C, the content provided by the game system may only be displayed on to the television, the only media presentation device in the example. In addition, on an HDMI-CEC network, a game system is not listed in the assigned logical addresses, so the game system may be identified as an unknown device on the HDMI-CEC network. An identifier (e.g., the identifier 410 of FIG. 4) may then identify the operating state of the television and the amplifier as powered-on and actively presenting media content from the game system. Further, the DVDR 108 may be identified as in an operating state of recording media content for future presentation and the STB 106 may be identified in an operational state of providing media content for future presentation.

FIG. 7 is a flowchart depicting an example method 700 to determine the operating state of an AV device connected to an AV network (e.g., the AV network 100 of FIG. 1) through analysis of the operating states of all AV devices (e.g., the television 104, the STB 106, the DVDR 108, the game system 110 and the amplifier 112) connected to the AV network 100. The method 700 may be implemented in a manner similar to the method 500 of FIG. 5 so, for brevity, the example implementations are not repeated.

Initially, the method 700 identifies all AV devices connected to the AV network 100 (block 702). The identification of the AV devices on the AV network 100 may be included in another process such as the example method 500 of FIG. 5, done as part of the method 700, or as part of both the method 500 and the method 700. Once the AV devices are identified, the operating state of each AV device communicating on the AV network 100 is identified (blocks 704 and 706).

Once an identifier (e.g., the identifier 410 of FIG. 4) identifies the operating states of all the AV devices on the AV network 100, the operating states are analyzed as a system of interconnected devices (block 708), as described above in conjunction with FIGS. 6A-6C. In other words, the operating states of each AV device are examined in relation to the operating states of the other AV devices on the AV network 100. Once the operating states are analyzed, the operating state of each AV device is identified in relation to the operating states of all the AV devices communicatively coupled to the AV network 100 (block 710). For example, through analysis of the operating states of the devices listed in FIG. 6C, the identifier 410 (FIG. 4) identified the operating state of the television as powered-on and presenting the content of the DVDR.

FIG. 8 is a schematic diagram of an example processor platform 800 that may be used and/or programmed to implement all or a portion of any or all of the example operations of FIGS. 5 and 7. For example, the processor platform 800 can be implemented by one or more general-purpose processors, microcontrollers, etc. The example processor platform 800, or a platform similar thereto, may be used to implement the bus monitor 214 and/or the identifier apparatus 400. The processor platform 800 of the example of FIG. 8 includes at least one general-purpose programmable processor 802. The processor 802 executes coded instructions 804 and/or 806 present in main memory of the processor 802 (e.g., within a RAM 808 and/or a ROM 810). The processor 802 may be any type of processing unit, such as a processor or a microcontroller. The processor 802 may execute, among other things, the example methods and apparatus described herein.

The processor 802 is in communication with the main memory (including a RAM 808 and/or a ROM 810) via a bus 812. The RAM 808 may be implemented by dynamic random-access memory (DRAM), synchronous dynamic random-access memory (SDRAM), and/or any other type of RAM device, and the ROM 810 may be implemented by flash memory and/or any other desired type of memory device. A memory controller 814 may control access to the memory 808 and the memory 810.

The processor platform 802 also includes an interface circuit 816. The interface circuit 816 may be implemented by any type of interface standard, such as an the AV network controller 210, external memory interface, serial port, general purpose input/output, etc. One or more input devices 818 and one or more output devices 820 are connected to the interface circuit 816.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for identifying the operating state of an audio-video (AV) device, the method comprising:
monitoring messages transmitted via a data bus in a first AV device, wherein the data bus is communicatively coupled to a processor and an AV network controller of the first AV device, and wherein the AV network controller is further communicatively coupled to a second AV device external to the first AV device;
extracting, from the monitored messages, messages associated with an operation of the second AV device;
analyzing a temporal sequence of the extracted messages for data associated with an operating state of the second AV device;
when the temporal sequence is missing an expected message related to the operating state of the second AV device, sending a command to the AV network controller to request operating state information from the second AV device; and
identifying the operating state of the second AV device by analyzing the extracted messages and a response from the second AV device including the operating state information.

2. A method as defined in claim 1, further comprising monitoring exposure of media provided by an AV device communicatively coupled to the AV network controller based on the operating state of the second AV device.

3. A method as defined in claim 1, wherein the AV network controller comprises a Consumer Electronic Control data bus controller.

4. A method as defined in claim 1, wherein the AV network controller is communicatively coupled to a plurality of AV devices external to the first AV device.

5. A method as defined in claim 1, wherein extracting messages associated with the operation of the second AV device comprises extracting commands sent to the second AV device and responses from the second AV device, or commands sent from the second AV device and responses to the second AV device.

6. A method as defined in claim 1, wherein the missing expected message is associated with a user interaction with the second AV device.

7. A method as defined in claim 1, wherein sending the command to the AV network controller requesting the operating state information comprises generating a command addressed to the second AV device or a command broadcast to a plurality of AV devices.

8. A method as defined in claim 1, wherein identifying the operating state of the second AV device comprises analyzing an AV device event associated with the extracted messages or an AV device event associated with the response received from the second AV device.

9. A method as defined in claim 1, wherein identifying the operating state of the second AV device further comprises analyzing the operating states of a plurality of AV devices communicatively coupled to the AV network controller.

10. A method for identifying the operating state of an audio-video (AV) device, the method comprising:
    monitoring messages transmitted via a data bus in a first AV device, wherein the data bus is communicatively coupled to a processor and an AV network controller of the first AV device, and wherein the AV network controller is further communicatively coupled to one or more AV devices external to the first AV device;
    extracting from the monitored messages, messages associated with an operation of the one or more external AV devices;
    analyzing a temporal sequence of the extracted messages to determine whether an operating state of the one or more external AV devices is identifiable via the extracted messages;
    when the temporal sequence indicates that the operating state is unidentifiable due to the temporal sequence missing an expected message, sending a command to the AV network controller to request operating state information from the one or more external AV devices; and
    identifying the operating state of the one or more external AV devices by analyzing the extracted messages and a response from the one or more external AV devices including the operating state information.

11. A method as defined in claim 10, further comprising monitoring exposure of media provided via an AV device communicatively coupled to the AV network controller based on the operating state of the one or more external AV devices.

12. A method as defined in claim 10, wherein the AV network controller module comprises a Consumer Electronic Control data bus controller.

13. A method as defined in claim 10, wherein extracting messages associated with the operation of the one or more external AV devices comprises extracting commands sent to the one or more external AV devices and responses from the one or more external AV devices, or commands sent from the one or more external AV devices and responses to the one or more external AV devices.

14. A method as defined in claim 10, wherein the missing expected message is associated with a user interaction with the one or more external AV devices.

15. A method as defined in claim 10, wherein sending the command to the AV network controller requesting the operating state information comprises generating a command addressed to a first one of the one or more external AV devices or a command broadcast to a plurality of the one or more external AV devices.

16. A method as defined in claim 10, wherein identifying the operating state of the one or more external AV devices comprises analyzing an AV device event associated with the extracted messages or an AV device event associated with the response received from the one or more external AV devices.

17. A method as defined in claim 10, wherein identifying the operating state of the one or more external AV devices further comprises analyzing the operating states of other ones of the one or more external AV devices communicatively coupled to the AV network controller.

18. An apparatus for identifying the operating state of an audio-video (AV) device, the apparatus comprising:
    a monitor communicatively coupled to a data bus in a first AV device and configured to monitor messages conveyed on the data bus, wherein the data bus is communicatively coupled to a processor and an AV network controller of the first AV device, and wherein the AV network controller is further communicatively coupled to a second AV device external to the first AV device;
    an extractor coupled to the monitor and configured to extract messages associated with an operating state of the second AV device;
    an analyzer to analyze a temporal sequence of the extracted messages for data associated with the operating state of the second AV device;
    a requestor to, when the temporal sequence is missing an expected message related to the operating state of the second AV device, send a command to the AV network controller to request operating state information from the second AV device; and
    an identifier to analyze the extracted messages and a response including the operating state information to identify the operating state of the second AV device.

19. An apparatus as defined in claim 18, wherein the monitor is to monitor exposure of media provided by an AV device communicatively coupled to the AV network controller based on the operating state of the second AV device.

20. An apparatus as defined in claim 18, wherein the AV network controller is communicatively coupled to a plurality of AV devices external to the first AV device.

21. An apparatus as defined in claim 18, wherein the monitor is to monitor messages associated with an AV device event associated with a user interaction with the second AV device.

22. An apparatus as defined in claim 18, wherein the extracted messages associated with the operating state of the second AV device comprise commands sent to the second AV device and responses from the second AV device, or commands sent from the second AV device and responses to the second AV device.

23. An apparatus as defined in claim 18, wherein the expected missing message is associated with a user interaction with the second AV device.

24. An apparatus as defined in claim 18, wherein the command sent to the AV network controller to request the operating state information is addressed to the second AV device or broadcast to a plurality of AV devices.

25. An apparatus for identifying the operating state of an audio-video (AV) device, the apparatus comprising:
    a monitor communicatively coupled to a data bus in a first AV device and configured to monitor messages conveyed on the data bus, wherein the data bus is communicatively coupled to a processor and an AV network controller of the first AV device, and wherein the AV network controller is further communicatively coupled to one or more AV devices external to the first AV device;
    an extractor to extract messages associated with an operating state of the one or more external AV devices;
    an analyzer to analyze a temporal sequence of the extracted messages to determine whether the operating state of the one or more external AV devices is identifiable via the extracted messages;
    a requestor to, when the temporal sequence indicates that the operating state is unidentifiable due to the temporal sequence missing an expected message, send a command to the AV network controller to request operating state information from the one or more external AV devices; and
    an identifier to analyze the extracted messages and a response from the one or more external AV devices including the operating state information to identify the operating state of the one or more external AV devices.

26. An apparatus as defined in claim 25, wherein the monitor is further configured to monitor exposure of media provided by an AV device communicatively coupled to the AV network controller based on the operating state of the one or more external AV devices.

27. An apparatus as defined in claim 25, wherein the monitor is to monitor messages associated with an AV device event associated with a user interaction with one of the one or more external AV devices.

28. An apparatus as defined in claim 25, wherein the extracted messages associated with the operating state of the one or more external AV devices comprise commands sent to the one or more external AV devices and responses from the AV one or more external AV devices or commands sent from the one or more external AV devices and responses to the one or more external AV devices.

29. An apparatus as defined in claim 25, wherein the missing expected message is associated with a user interaction with the one or more external AV devices.

30. An apparatus as defined in claim 25, wherein the command sent to the AV network controller to request the operating state information is addressed to a first one of the one or more external AV devices or broadcast to a plurality of the one or more external AV devices.

31. An audio-video (AV) device, comprising:
- a processor coupled to a High Definition Multimedia Interface (HDMI) interface, wherein the HDMI interface is to be coupled to a second AV device having a plurality operating states, the second AV device being external to the AV device;
- a monitor to extract data communicated via a data bus coupling the processor to the HDMI interface, wherein the monitor is to extract:
  - a first message originating at the processor and having the second AV device as a destination; and
  - a second message originating at the second AV device and having the processor as a destination;
- an analyzer to analyze a temporal sequence of the first message and the second message to determine if additional information is needed from the second AV device to identify a current one of the operating states of the second AV device;
- a requestor to, when the temporal sequence is missing an expected message related to the second AV device needed to identify the current one of the operating states of the second AV device, send a command to a AV network controller to request operating state information from the second AV device; and
- an identifier to analyze a response from the second AV device including the operating state information to identify the current one of the operating states of the second AV device.

* * * * *